United States Patent
Gan et al.

(10) Patent No.: US 7,818,720 B2
(45) Date of Patent: Oct. 19, 2010

(54) SYSTEM AND METHOD FOR CONTROL LOGIC CODE REORDERING BASED ON STOCHASTIC EXECUTION TIME INFORMATION

(75) Inventors: Kim-Chyan Gan, Bellevue, WA (US); Lucio F. C. Pessoa, Cedar Park, TX (US); Wen Wu Su, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1305 days.

(21) Appl. No.: 11/338,252

(22) Filed: Jan. 24, 2006

(65) Prior Publication Data
US 2007/0174830 A1 Jul. 26, 2007

(51) Int. Cl.
*G06F 9/44* (2006.01)
(52) U.S. Cl. .................. 717/130; 717/131; 717/137
(58) Field of Classification Search .................. None
See application file for complete search history.

(56) References Cited

U.S. PATENT DOCUMENTS

| 5,212,794 A | 5/1993 | Pettis et al. ................ 717/153 |
| 5,999,923 A * | 12/1999 | Kowalski et al. .............. 706/47 |
| 6,742,143 B2 * | 5/2004 | Kaler et al. .................... 714/39 |
| 2004/0093589 A1 * | 5/2004 | Master ....................... 717/136 |

OTHER PUBLICATIONS

Pettis et al., "Profile Guided Code Positioning," 20 years of the ACM/SIGPLAN Conference on Programming Language Design and Implementation (1979-1999), A Selection 2003. ACM, 2003 (originally published 1990, ACM PLDI in White Plains, NY). pp. 398-411.

* cited by examiner

*Primary Examiner*—Chuck O Kendall
(74) *Attorney, Agent, or Firm*—VanLeeuwen & VanLeeuwen; Joanna G. Chiu

(57) ABSTRACT

A method, computer program product, and data processing system for performing automated optimization of a control processing flow containing Boolean conditional expressions is disclosed. Each conditional expression is profiled using a representative set of test vectors to determine the probabilities of individual conditions and combinations of conditions in the expression. Next, the expression is restructured or reordered, including selective computation of subexpressions, based on the probability information, so as to maximize the probability of a short-circuit termination of evaluation of the expression and/or to minimize the statistical execution time of the expression. This process is performed for all Boolean conditional expressions related to the control processing flow.

17 Claims, 5 Drawing Sheets

SYSTEM AND METHOD FOR CONTROL LOGIC CODE REORDERING BASED ON STOCHASTIC EXECUTION TIME INFORMATION

FIELD OF THE INVENTION

The present invention is related generally to control processing flow optimization, and in particular, to optimization of control processing flow involving the evaluation of complex Boolean expressions.

RELATED ART

Computers are, in general, sequential machines. For this reason, the behavior and performance of a computer program is, at least to some degree, dependent on the order in which operations specified in the computer program are performed. In some instances, the order in which a program's instructions are executed not only has an effect on the performance of the program, it may determine whether or not the program will ever terminate execution. For example, on certain search problems, a depth-first search algorithm may execute indefinitely without yielding a solution, while a breadth-first search will yield a solution.

In the area of database management, for instance, query optimizers attempt to improve the performance of database searching by applying the most restrictive search criterion first. In this way, the remaining search criteria may be applied to a smaller subset of records than would be otherwise. A similar concept may be applied to programs written in logic programming languages, such as Prolog, where the order of terms in a clause or the order of clauses in a program may significantly impact the number of program iterations that must be performed to arrive at a solution.

One area in which execution order may make a significant difference is in programming languages that support short-circuit evaluation of logical expressions. The "C" programming language is one such language. Short-circuit evaluation occurs when a compound Boolean expression need not be evaluated in its entirety to obtain the correct answer. This phenomenon occurs with respect to the two main binary operators in Boolean algebra, the "AND" and "OR" operators. For example, with the disjunctive "C" expression "(x<y||x==7), meaning x is less than y or equal to 7, short-circuit evaluation of that expression would first test to see if x is less than y. If x is indeed less than y, then the whole expression must be true, since the expression is true if either of the two conditions, x<y and x==7, hold. Under short-circuit evaluation of the expression, evaluation of the expression would immediately terminate after determining that x<y; this is referred to as "short-circuiting" the evaluation of the expression. The subexpression x==7 would only be evaluated if x<y turned out to be false. Short-circuit evaluation may also be applied to conjunctive expressions (i.e., expressions where subexpressions are connected by Boolean "AND" operations).

One way of thinking about short-circuit evaluation is to recognize that in a computer language that supports short-circuit evaluation, a conjunctive disjunctive conditional expression is semantically equivalent to a set of nested conditionals. For example, consider the "C" statement in Table 1, below.

TABLE 1

```
if (x < y || x == 7) {
        more_operations( );
}
```

The conditional statement in Table 1 is semantically equivalent to the nested conditional statement in Table 2.

TABLE 2

```
if (x < y) {
        goto label;
}
else {
        if(x == 7) {
label:    more_operations( );
        }
}
```

Similarly, in the case of a conjunctive expression, there is also an equivalent nested conditional. For instance, the conjunctive conditional statement in Table 3 (also in the "C" programming language) is semantically equivalent to the nested conditional in Table 4. In this example, the subexpression "x % 2" means "x is an odd number" (literally, x mod 2≠0).

TABLE 3

```
if (x < y && x % 2) {
        more_operations( );
}
```

TABLE 4

```
if (x < y) {
        if(x % 2) {
            more_operations( );
        }
}
```

The order in which the subexpressions in a conjunction or disjunction are evaluated will, in general, have an impact on the speed at which that conjunction or disjunction will be evaluated, since some conditions will occur more frequently than others. Furthermore, computation of subexpressions should be associated with a high probability of actually making use of them. It would be desirable for there to be an automated process for optimizing such expressions, so that the expected execution time for evaluating them is reduced in statistical sense.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
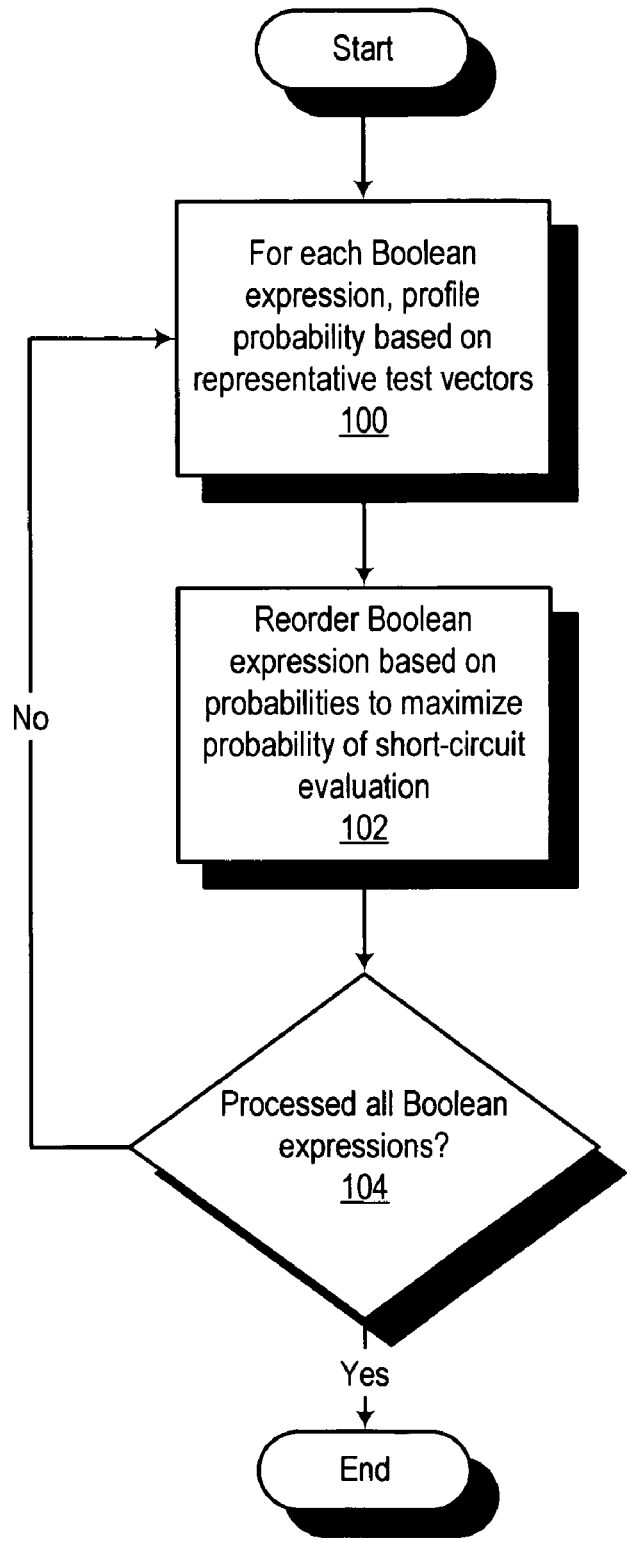
FIG. 1 is a flowchart representation of an overall process of optimizing Boolean expressions in a computer program in accordance with a preferred embodiment of the present invention.

A preferred embodiment of the present invention performs automated optimization of program code containing conditional expressions. As shown in FIG. 1, each Boolean expression is profiled using a representative set of test vectors to determine the probabilities of individual conditions and combinations of conditions in the expression (block 100). The results of this profiling are recorded in primary storage (e.g., random access memory) or in secondary storage (e.g., disk storage). Next, the expression is restructured or reordered, based on the probability information, so as to maximize the probability of a short-circuit termination of evaluation of the expression and/or to minimize the expected execution time of the expression (block 102). This process is performed for all Boolean expressions in the program (block 104).

Figure 2:
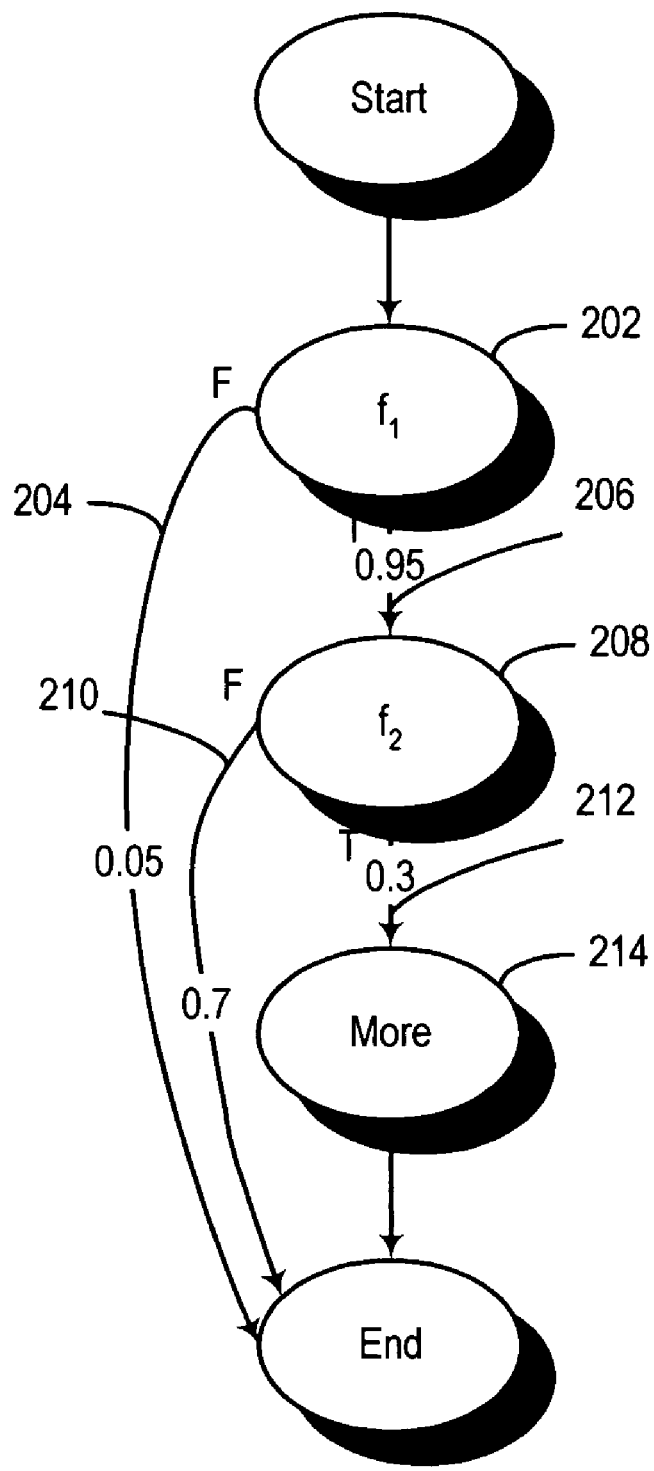
FIGS. 2 and 3 are diagrams illustrating an example of the basic operation of a preferred embodiment of the present invention.
Figure 3:
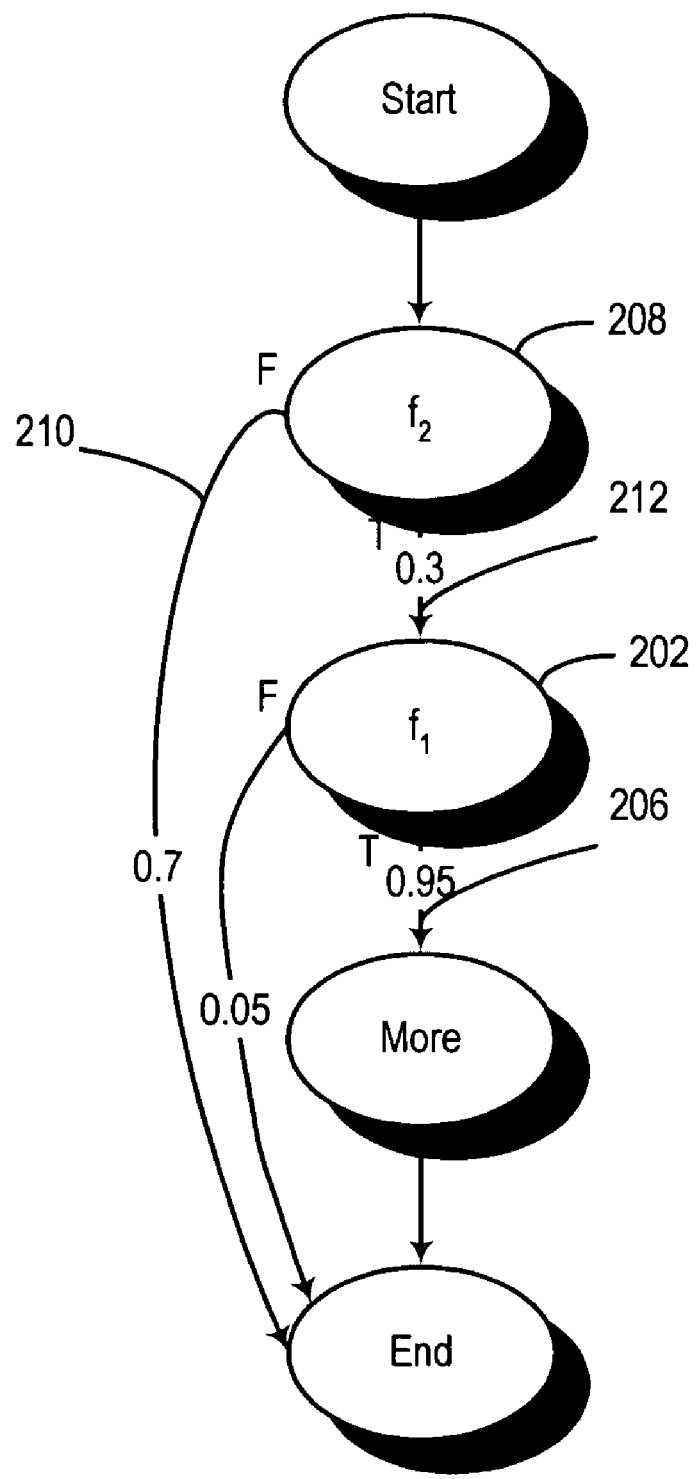

FIGS. 2 and 3 illustrate this basic process by way of an example. FIG. 2 is a decision diagram for a conditional statement of the form "if($f_1$ && $f_2$) {More}" (i.e., if $f_1$ is true and $f_2$ is true, then perform "More"). Ovals 202 and 208 represent tests of the conditions $f_1$ and $f_2$. Profiling of this code reveals that $f_1$ is true 95% of the time (arc 206) and false 5% of the time (arc 204)—that is, P($f_1$), the probability of $f_1$ being true, is 0.95. Similarly, P($f_2$)=0.3 (arcs 210 and 212). If we assume, then, that the cost (in execution time, or some other useful quantity, such as power consumption, for example) of performing each conditional test is 2 and we neglect the cost of "More" (so that we only consider the time spent evaluating the Boolean expression), we can calculate the expected cost for the expression as $$E(c)=2+2P(f_1)=2+2(0.95)=3.9,$$

where the initial "2" term comes from the fact that the first conditional test (oval 202) must always be performed, while the second term comes from the fact that the second conditional test (oval 208) is only performed with probability 0.95, the probability that the first conditional test has the result "true" (arc 206). On the other hand, if the expression is reordered as "if($f_2$ && $f_1$) {More}," as in FIG. 3, the expected cost is $$E(c)=2+2P(f_2)=2+2(0.3)=2.6,$$

which is considerably less.

The example in FIGS. 2 and 3 actually illustrates a special case, where each conditional test has the same cost associated with it. In this special case, a conjunctive expression (such as that illustrated in FIGS. 2 and 3) is optimized by evaluating the individual conditional tests in increasing order of probability, as shown in FIG. 3. Analogously, a disjunctive expression is optimized by evaluating the individual conditional tests in decreasing order of probability. In this manner, the probability of obtaining a short-circuit evaluation is increased, so that the expected execution time for evaluating such expressions is reduced in statistical sense. For instance, in FIG. 3, it is more likely that the conditional test for $f_2$ (oval 208) will yield a result of "false," thus short-circuiting the evaluation (arc 210), rather than "true," which would require an additional conditional test (arc 212, oval 202).

Figure 4:
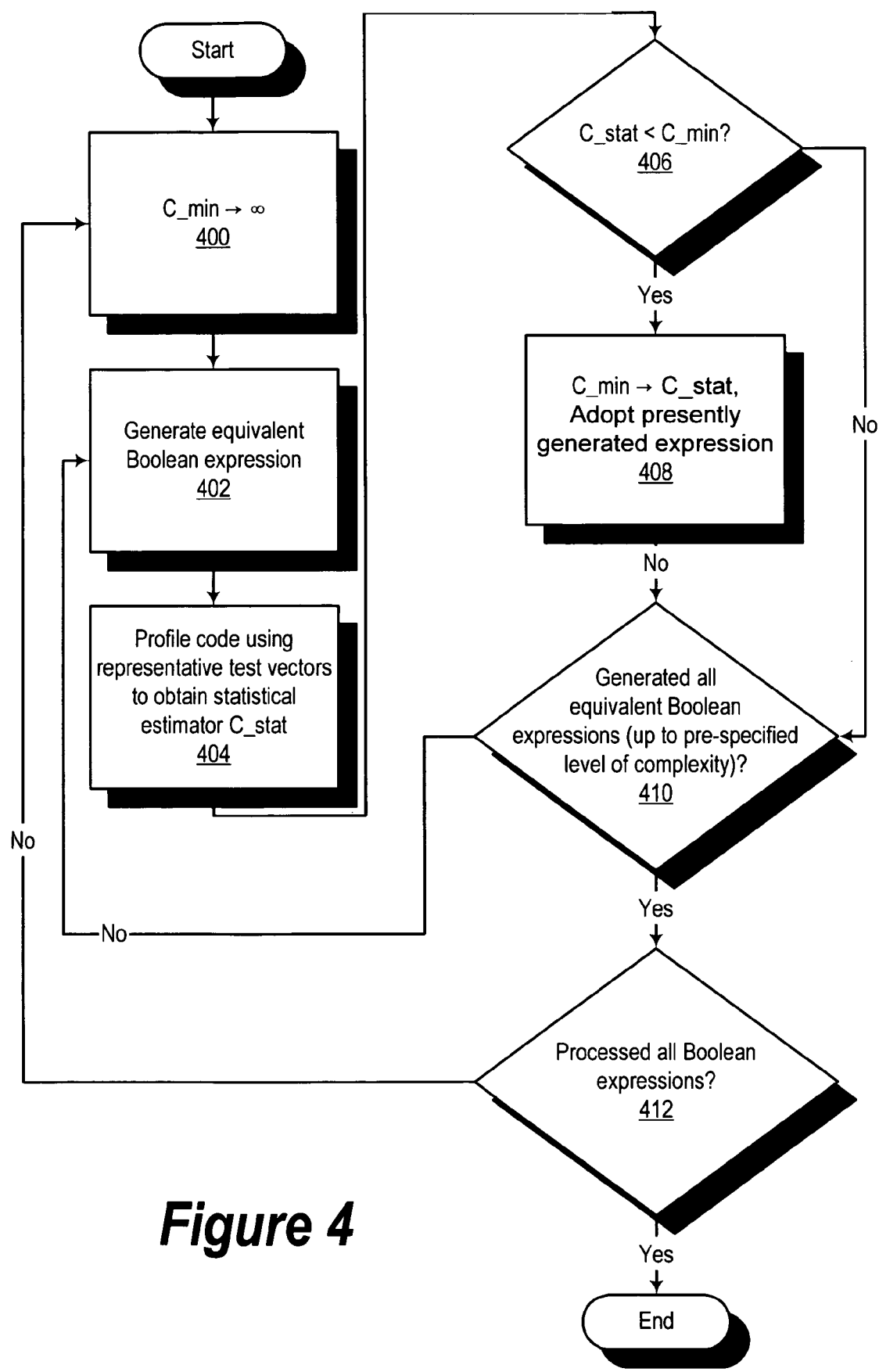
FIG. 4 is a flowchart representation of a process of a generalized process of optimizing Boolean expressions in a computer program in accordance with a preferred embodiment of the present invention.

More complex Boolean expressions require a more general optimization algorithm, such as that illustrated in FIG. 4 with respect to a preferred embodiment of the present invention. In this generalized process, the first step is to initialize a variable "C_min," representing the current minimum cost for the current expression; this "C_min" variable is first set to an arbitrarily high value, denoted here by the infinity sign "a" (block 400).

Next, a Boolean expression that is logically equivalent to the current expression is generated (e.g., by reordering the expression terms or applying Boolean algebra transformation rules, such as DeMorgan's Rule, etc.) (block 402). The code obtained from the generated Boolean expression is then profiled using representative test vectors to obtain a statistical estimator "C_stat" (block 404). This statistical estimator may be the expected (i.e., mean) cost associated with the generated expression or it may be some other statistic or heuristic function (e.g., function of mean and variance of cost, rank-order function of cost, etc.). If the estimator "C_stat" is less than "C_min" (block 306:yes), denoting a lower-cost implementation of the expression, then the new value of "C_min" is set to the current value of "C_stat" and the presently generated equivalent expression is adopted as the current solution to the optimization (block 408).

Next, a determination is made as to whether all equivalent Boolean expressions (up to a pre-specified level of complexity or up to a pre-specified limited number of equivalent expressions) have been generated (block 410). If not (block 410:no), the process cycles back to block 402 to generate another candidate solution. If all equivalent expressions (up to pre-specified limits) have been generated (block 410:yes), then if there are additional Boolean expressions in the program to be optimized (block 412:no), then the process cycles back to block 400 to consider the next Boolean expression. Otherwise, the process terminates (block 412).

Figure 5:
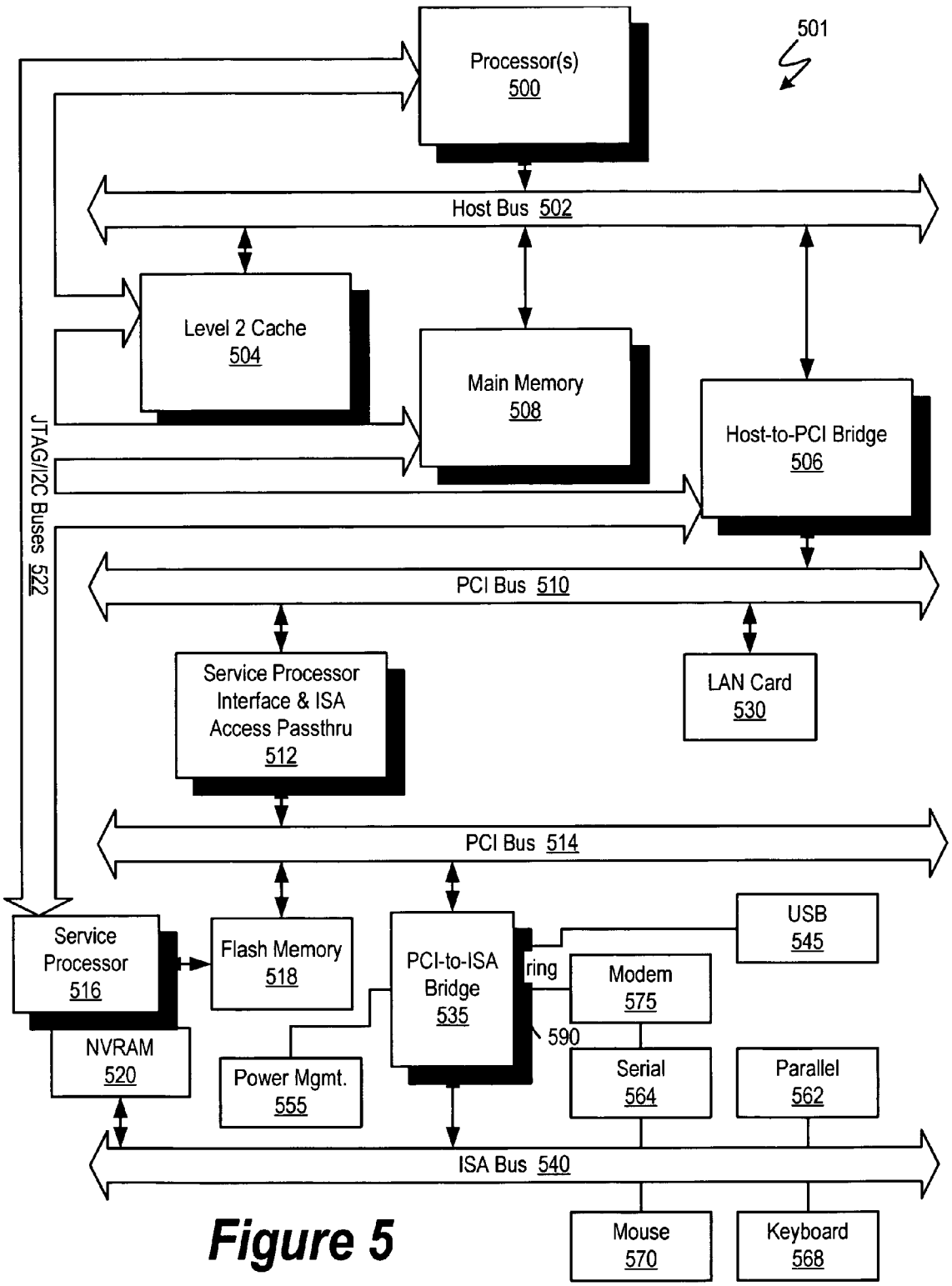
FIG. 5 is a block diagram of a data processing system in which a preferred embodiment of the present invention may be implemented.

FIG. 5 illustrates information handling system 501 which is a simplified example of a computer system capable of performing the computing operations of the host computer described herein with respect to a preferred embodiment of the present invention. Computer system 501 includes processor 500 which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Passthrough 512 provide an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C buses 522 for communication with processor(s) 500 during initialization steps. JTAG/I2C buses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-executed method comprising:
   profiling execution of a control processing flow to obtain empirical information regarding a plurality of Boolean conditions associated with execution of the control processing flow; and
   transforming Boolean condition evaluation code within the control processing flow to obtain improved code, the transforming comprising rearranging an order in which the plurality of Boolean conditions are tested, wherein the improved code is improved with respect to a performance heuristic that is estimated using the empirical information.

2. The method of claim 1, wherein the empirical information comprises probabilities of the Boolean conditions being true or false during execution of the control processing flow.

3. The method of claim 1, wherein the heuristic estimates statistical execution time, wherein the statistical execution time is derived from average execution time or from variance of execution time.

4. The method of claim 1, wherein the Boolean condition evaluation code evaluates a conjunctive Boolean expression.

5. The method of claim 1, wherein the Boolean condition evaluation code evaluates a disjunctive Boolean expression.

6. The method of claim 1, wherein the Boolean condition evaluation code is transformed such that an estimated likelihood of short circuit Boolean evaluation in the improved code is greater than an estimated likelihood of short circuit Boolean evaluation in the Boolean condition evaluation code, and wherein the estimated likelihood of short circuit Boolean evaluation in the improved code that the estimated likelihood of short circuit Boolean evaluation in the Boolean condition evaluation code are estimated from the empirical information.

7. A computer program product stored in a tangible computer-readable medium, comprising functional descriptive material that, when executed by a computer, directs the computer to perform actions that include:
   obtaining empirical information regarding a plurality of Boolean conditions associated with execution of a control processing flow; and
   transforming Boolean condition evaluation code within the control processing flow to obtain improved code, the transforming comprising rearranging an order in which the plurality of Boolean conditions are tested, wherein the improved code is improved with respect to a performance heuristic that is estimated using the empirical information.

8. The computer program product of claim 7, wherein the empirical information comprises probabilities of the Boolean conditions being true or false during execution of the control processing flow.

9. The computer program product of claim 7, wherein the empirical information is obtained by profiling execution of the control processing flow.

10. The computer program product of claim 7, wherein the empirical information is obtained from storage.

11. The computer program product of claim 7, wherein the heuristic estimates statistical execution time, wherein the statistical execution time is derived from average execution time or from variance of execution time.

12. The computer program product of claim 7, wherein the Boolean condition evaluation code evaluates a conjunctive Boolean expression.

13. The computer program product of claim 7, wherein the Boolean condition evaluation code evaluates a disjunctive Boolean expression.

14. The computer program product of claim 7, wherein the Boolean condition evaluation code is transformed such that an estimated likelihood of short circuit Boolean evaluation in the improved code is greater than an estimated likelihood of short circuit Boolean evaluation in the Boolean condition evaluation code, and wherein the estimated likelihood of short circuit Boolean evaluation in the improved code that the estimated likelihood of short circuit Boolean evaluation in the Boolean condition evaluation code are estimated from the empirical information.

15. A data processing system comprising:
  at least one processor;
  at least one storage system associated with the at least one processor;
  a set of instructions in the at least one storage system, wherein the set of instructions is executed by the at least one processor to perform actions that include:
    obtaining empirical information regarding a plurality of Boolean conditions associated with execution of a control processing flow; and
    transforming Boolean condition evaluation code within the control processing flow to obtain improved code, the transforming comprising rearranging an order in which the plurality of Boolean conditions are tested, wherein the improved code is improved with respect to a performance heuristic that is estimated using the empirical information.

16. The data processing system of claim 15, wherein the heuristic estimates statistical execution time, wherein the statistical execution time is derived from average execution time or from variance of execution time.

17. The data processing system of claim 15, wherein the Boolean condition evaluation code is transformed such that an estimated likelihood of short circuit Boolean evaluation in the improved code is greater than an estimated likelihood of short circuit Boolean evaluation in the Boolean condition evaluation code, and wherein the estimated likelihood of short circuit Boolean evaluation in the improved code that the estimated likelihood of short circuit Boolean evaluation in the Boolean condition evaluation code are estimated from the empirical information.

* * * * *